US007127274B2

(12) United States Patent
Goldberg

(10) Patent No.: US 7,127,274 B2
(45) Date of Patent: Oct. 24, 2006

(54) METHOD AND SYSTEM FOR REDUCING THE EFFECT OF SIGNAL-INTERFERENCE IN NULL AREAS CAUSED BY ONE OR MORE ANTENNAS

(75) Inventor: Steven Jeffrey Goldberg, Downingtown, PA (US)

(73) Assignee: InterDigital Ttechnology Corporation, Wilmington, DE (US)

( * ) Notice: Subject to any disclaimer, the term of this patent is extended or adjusted under 35 U.S.C. 154(b) by 0 days.

(21) Appl. No.: 10/465,345

(22) Filed: Jun. 19, 2003

(65) Prior Publication Data

US 2004/0048575 A1  Mar. 11, 2004

Related U.S. Application Data

(60) Provisional application No. 60/409,117, filed on Sep. 6, 2002.

(51) Int. Cl.
 *H04M 1/00* (2006.01)
(52) U.S. Cl. .................. 455/562.1; 455/424; 455/63.4; 455/66.1; 455/288
(58) Field of Classification Search ................ 455/436, 455/437, 438, 439, 443, 444, 442, 446–449, 455/450, 453, 422.1, 456.1, 561, 562.1, 423, 455/424, 25, 501, 522, 63.1, 63.2, 63.4, 66.1, 455/67.11, 67.13, 68, 272, 276.1, 283, 288
See application file for complete search history.

(56) References Cited

U.S. PATENT DOCUMENTS

| | | | | | |
|---|---|---|---|---|---|
| 5,577,265 | A | * | 11/1996 | Wheatley, III | ............... 370/335 |
| 6,070,090 | A | * | 5/2000 | Feuerstein | ................... 455/561 |
| 6,154,661 | A | * | 11/2000 | Goldburg | ................. 455/562.1 |
| 6,463,301 | B1 | * | 10/2002 | Bevan et al. | ............ 455/562.1 |

OTHER PUBLICATIONS

Norklit et al., "Jitter Diversity in Multipath Environments," IEEE Vehicular Technology Conference, 45th, vol. 2, Jul. 25-28, 1995, pp. 853-857.
Zekavat et al., "Smart Antenna Spatial Sweeping for Combined Directionality and Transmit Diversity," Journal of Communications and Networks: Special Issue in Adaptive Antennas for Wireless Communications, vol. 2, No. 4, Dec. 2000, pp. 325-330.

* cited by examiner

*Primary Examiner*—Charles Craver
(74) *Attorney, Agent, or Firm*—Volpe and Koenig, P.C.

(57) ABSTRACT

In wireless communications, a method and system for enhancing signal decoding capability in null areas uses dithering to break up or modify the null areas. The null areas form in overlapping regions of the beams of two antennas or in overlapping regions of a single signal that is subject to multipath. Dithering is used to spread the null areas over a wider region so that a WTRU in an overlap region will not statically remain within a null area.

40 Claims, 3 Drawing Sheets

METHOD AND SYSTEM FOR REDUCING THE EFFECT OF SIGNAL-INTERFERENCE IN NULL AREAS CAUSED BY ONE OR MORE ANTENNAS

CROSS REFERENCE TO RELATED APPLICATION(S)

This application claims priority from U.S. Provisional Application No. 60/409,117 filed on Sep. 6, 2002, which is incorporated by reference as if fully set forth.

FIELD OF INVENTION

This invention generally relates to interference-nulls, and more particularly to minimizing the effect of interference-nulls in a manner acceptable under certain communication standards.

BACKGROUND

In wireless broadcast systems where one or more antennas broadcast signals toward wireless transmit and receive units (WTRUs), there are sometimes null areas where interfering signals interact in a fashion that a WTRU in a certain location cannot decode the received signal. Null areas may be caused by a single antenna whose signal is subject to multipath wherein a direct path signal overlaps with one or more reflected signals. Null areas may also be caused by a plurality of antennas whose signals overlap.

As a result of null areas being present in a region of overlapping signals, while the majority of intended WTRUs in such overlapping regions may be able to properly receive signals, other WTRUs might not. Some WTRUs might not be able to decode the signals, and depending on the nature of the broadcast, there may be consequences of lost communication or other interference. Yet other intended WTRUs might interrogate the system later to see if they had missed some message, and if so, request retransmission of the message uniquely to themselves. Increasing the number of retransmissions results in less air time available for other transmissions. There may also be a timeliness issue about the delivery of the message. One method of addressing the problem in the prior art is to use time-diversity, thus reducing the odds that a WTRU would be in the null area for alternative directions of transmission or time frames.

U.S. Pat. No. 6,061,574 to Goldberg, teaches a controller which controls at least two transmitters to transmit simulcast signals during a time period. The two simulcast signals produce intersymbol interference at a receiver. One of the transmitters changes its output amplitude during a portion of the time period, altering the symbol interference during a portion of the time period.

U.S. Pat. No. 6,044,276 to Goldberg, et al. teaches a messaging system using a plurality of simulcasting base transmitters and a plurality of pseudorandom sequence generators. The generators generate pseudorandom sequences, which are different from one another during concurrent transmission by the base transmitter. A cancellation-affecting parameter of the plurality of base transmitters is adjusted in accordance with the plurality of pseudorandom sequences during the transmission from the base transmitters to limit intervals of carrier cancellation.

Known prior art does not offer a simple and inexpensive solution for addressing signal interference caused in the overlapping region of the signal beams from one or more antennas. Prior art techniques are generally consumers of radio frequency resources and are therefore undesirable. Prior art techniques also delay the time at which the communication is received by a certain percentage of the WTRUs or signal recipients.

It is therefore desirable to address null areas, without substantially increased cost and with a minimum consumption of RF resources.

SUMMARY

The present invention addresses the problems associated with not being able to receive signals in null areas in a decodable fashion. According to the present invention, the problems of interference-induced nulls are reduced by dithering a signal beam. Dithering may be obtained by boresight control, amplitude control or by a combination of amplitude and boresight control.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Figure 5:
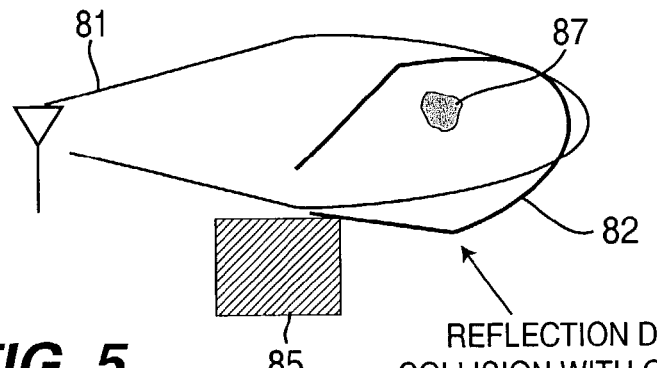
FIG. 5 is a schematic illustration of one antenna whose signal is subject to multipath wherein null areas exist within a region wherein the multipath signal's direct path signal and reflected signal overlap.

The invention will be explained with reference to signals transmitted in the form of beams (i.e. beam formed transmission patterns). That is, dithering may only be implemented on beam formed transmissions. Accordingly, the terms signal and beam may be used interchangeably herein. Further, the terms interference-null, interference null area, null area and null may all also be used interchangeably herein to refer to an area having sufficient interference to inhibit robust decoding. The interference may occur as a result of overlapping signals transmitted from two or more antennas (i.e. overlapping beams transmitted from two or more base stations as shown in FIG. 1) or from overlapping multipath signals transmitted from a single antenna (i.e. at least a portion of a direct path signal overlapping with at least a portion of at least one reflected signal as shown in FIG. 5).

Figure 1:
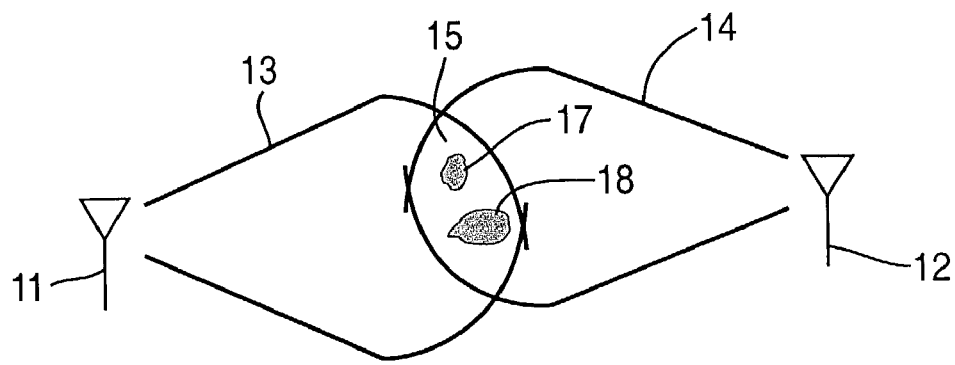
FIG. 1 is a schematic illustration of two antennas with overlapping beams having null areas therein.

Referring initially to FIG. 1, portions of normalized power patterns from two antennas 11, 12 (i.e. plural transmitters) are shown. In this embodiment, the two antennas 11, 12 belong to separate base stations and are transmitting signals, represented by radiation beam patterns 13, 14, with an overlap region 15 of their beams. It is understood that the depicted patterns are of a given field signal intensity and not nearly as sharply defined as depicted. The majority of the interference between the beams (overlapping region 15) does not lead to a WTRU in the area being unable to receive the signal in a decodable fashion. If the timing is correct and the error-correcting capability of the codes used in the data streams is robust enough, the WTRUs in most if not all of an overlapping region will be able to decode the transmission. Areas 17, 18, however, are places where the interference does not allow robust decoding (i.e. null areas).

The significant aspect of this situation is that some WTRUs, or any other User Equipment capable of sending and/or receiving signals in a wireless communication network, can be in positions, such as 17 and 18, where the interference of the signals does not allow decoding of the transmission. Depending on the nature of the broadcast, some WTRUs would just miss the signal. Others would interrogate the system later to see if they had missed some message, and if so request its retransmission uniquely to them.

Figure 2:
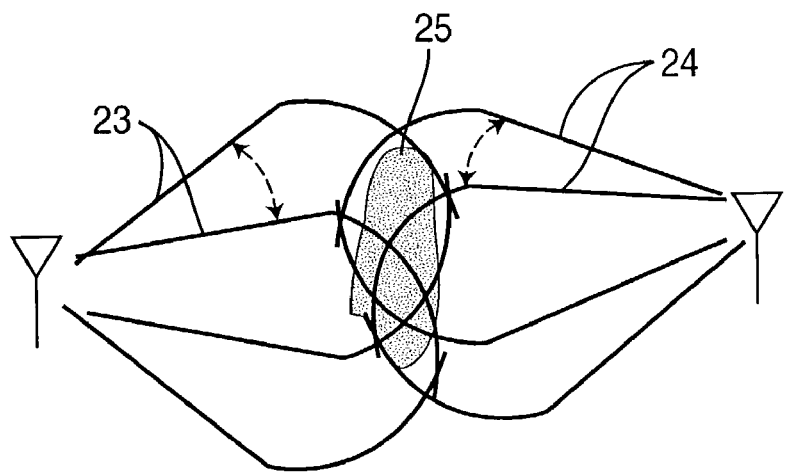
FIG. 2 is a schematic illustration of two antennas using dithering to break up null areas.

FIG. 2 shows the effect of two signals 23, 24 being dithered. Note, however, that a single beam or, where additional beams are present, any number of beams may be dithered, as desired. Dithering the beams 23, 24 has the effect of moving the nulls 17, 18 around within area 25. A WTRU within a null area 17, 18 would therefore not statically remain within the null area 17, 18. Area 25 is depicted to show that the instantaneous nulls 17, 18 are now being moved over a larger physical area, but with a lower duration. As mentioned, a signal may be dithered by boresight control, amplitude control, or a combination of amplitude control and boresight control.

In addition to the situation described above, null areas can also occur as a result of one base station sending a signal that is subject to multipath (i.e. where a direct path signal and at least one reflected signal overlap). The dithering of null areas caused by multipath will be described in detail in the description of FIGS. 5 and 6. Briefly, however, it is to be noted that the benefits of dithering described above in connection with overlapping signals from separate antennas/base stations are also realized where a single beam is dithered in a multipath interference situation. That is, the multiple paths (i.e. direct signal and reflect signal(s)) will also tend to dither and the null areas will shift or otherwise move around.

Figure 3:
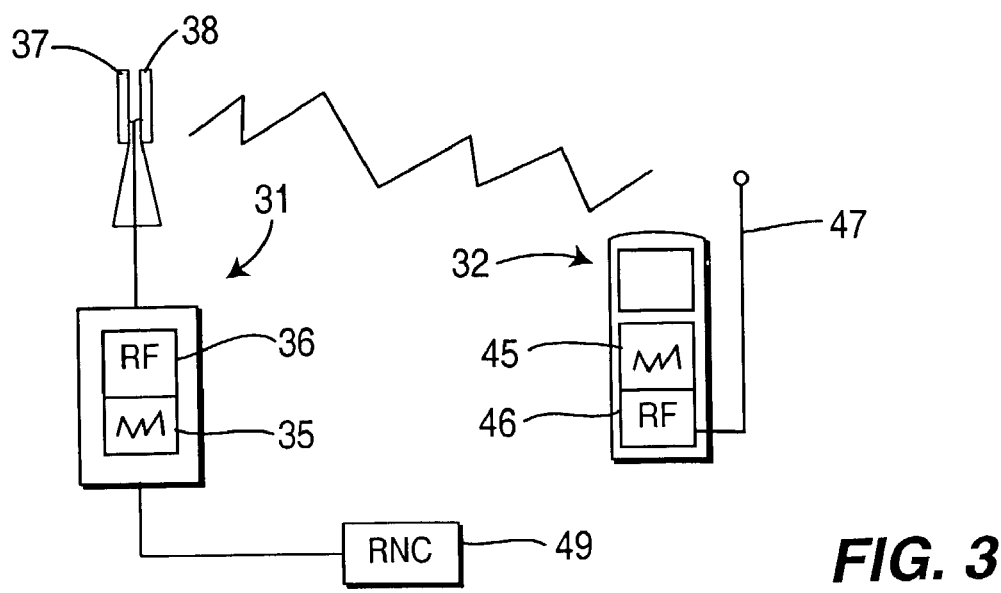
FIG. 3 is a schematic block diagram of a base station and a wireless transmit and receive unit (WTRU)

FIG. 3 is a schematic block diagram of a base station 31 and a WTRU 32. The base station 31, by way of example, includes a signal processor 35, an RF section 36 and one or more antennas 37, 38. In the preferred embodiment, the base station 31 may tranceive FDD CDMA signals, although the invention is suitable for TDD and any other type of modulation, as desired. The WTRU 32 includes a signal processor 45, an RF section 46 and an antenna 47. In an environment without interference, signals are transmitted between the base station 31 and the WTRU 32 and appropriately modulated and demodulated by the signal processing circuitry 35, 45 of the respective units. A radio network controller (RNC) 49 controls the radio network including base station 31 in coordination with other base stations wherein the base stations may simultaneously transmit signals to WTRUs (i.e. simulcasting base stations), as desired. The RNC 49 may send control signals to the base station 31 to provide synchronization time marks for aligning dithering changes.

Where null areas are present, either from two separate overlapping signals or from a multipath signal having a direct path signal overlapping at least one reflected signal, the signal(s) transmitted from the base station 31 (or other base stations) may be dithered to break-up the null areas, as desired, as explained herein. To dither the signals, the base station 31 may include a circuit for dithering the signals. To dither the signals, the circuit may adjust a transmission parameter (i.e. boresight, amplitude, or combination thereof), as desired.

The base station 31 may also include a circuit for determining whether null areas exist within a region having overlapping signals (i.e. determining whether there is a need to effect dithering). By way of example, this determination may be performed by tracking the occurrences of devices that report problems (such as uncorrectable errors, missed messages, nack reports) and comparing them to other devices in the expected coverage region. Another possible approach is to have users report reception problems and attempt dithering to correct them. If the dithering does not correct the problem, it is probably due to some cause other than a null area such as shadowing, excessive noise or being too far from a tower.

It should be noted that, in practice, it is most likely not worth trying to determine the actual position of devices. The nulls are likely to drift over time, so a preferred approach is to effect dithering so as to move the nulls around and monitor the overall statistics. That is, generally speaking, the simplest implementation may be to just turn dithering on and off occasionally and observe the delivery statistics. In most cases, the statistics should improve with dithering and, if so, dithering should be implemented continuously.

The circuits as well as the functions performed by the circuits may be combined or implemented separately, as desired.

In multipath situations, the antenna whose signal is subject to multipath is normally the signal being dithered. In situations where signals of one or more antennas are overlapping, all of the signals contributing to the overlapping area in which null areas exist may be dithered (i.e. as shown in FIG. 2). Alternatively, one or more of the contributing signals may be dithered, as desired.

Figure 4:
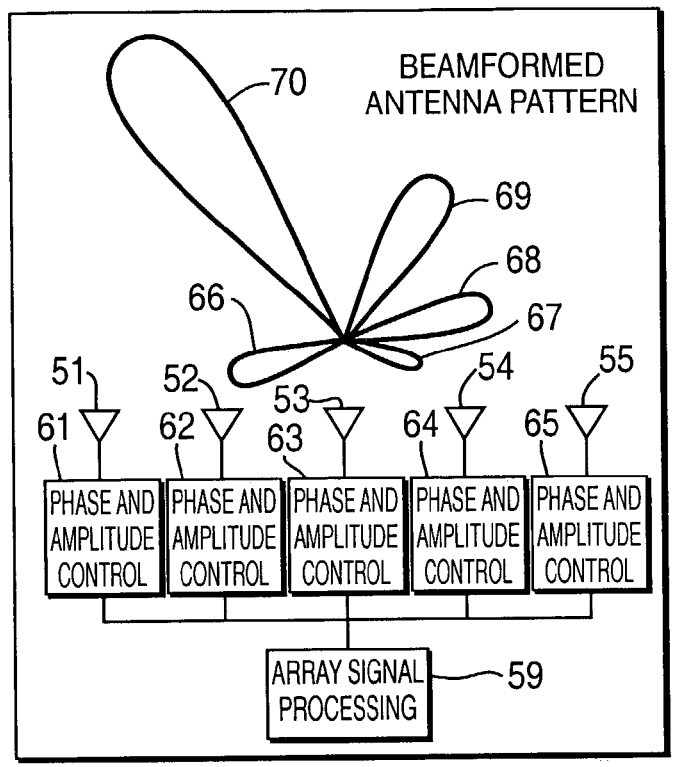
FIG. 4 is a diagram illustrating how boresight control and amplitude control can be implemented for dithering in accordance with the present invention.

FIG. 4 is a more detailed depiction of the antennas shown in FIGS. 1, 2, 5 and 6. That is, it should be noted that each antenna described herein is preferably an array or antennas (i.e. an antenna array) 51–55, as shown in FIG. 4. The antenna array 51–55 is controlled by an array signal processor 59 to generate beam-formed transmission patterns which are dithered in accordance with the present invention. The "phase" and "amplitude" blocks 61–65 may be used, as desired, to adjust the boresight angle and amplitude of the beam to cause dithering to break up null areas, which would otherwise form without the dithering thereof. Other means, electronic and mechanical, for causing dithering and beam forming are within the purview of the invention.

FIG. 4 is also a more detailed depiction of a beam (as opposed to the single-lobed (i.e. the main beam) version of FIGS. 1, 2, 5 and 6). That is, beams typically include side lobes 66–69 which are much smaller than the main beam 70. For simplicity, only the main beam is shown in FIGS. 1, 2, 5 and 6.

Referring now to FIG. 5, the dithering of the signals may also be used to reduce multipath interference. FIG. 5 is a diagram showing a representation of an overlapping (multipath) coverage area of a direct path signal 81 and a reflected signal 82. A signal subject to multipath may of course include many more reflected signals, although only two are shown for simplicity. Typically, multipath is caused by a signal reflecting off of a large object such as a building 85. As is well known to those skilled in the art of signal propagation and antennas, multipath signals generate noise which is sometimes difficult to filter. Therefore, multipath signals may also result in overlapping signals having a null area 87 due to the cancellation effect of the two versions of the beam being received.

Figure 6:
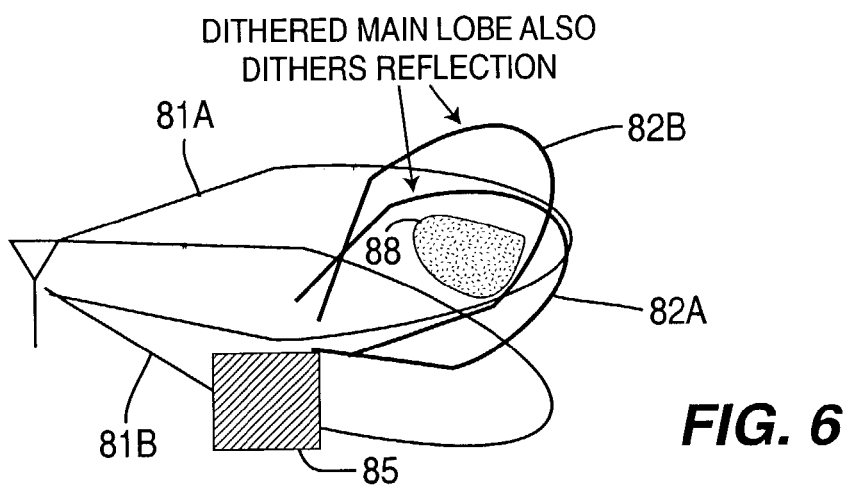
FIG. 6 is a schematic illustration wherein the direct path and reflected signals of FIG. 5 are dithered in accordance with the present invention.

FIG. 6 is a diagram showing the effect of dithering of the direct path signal 81 shown in FIG. 5. The dithering causes the direct path signal 81 and the reflected signal 82 to move. The movement of the direct signal 81 and reflected signal 82 is illustrated by reference numerals 81A, 81B and 82A, 82B, respectively.

As mentioned, there may be many reflections produced and any number of them received in various areas. The effects of dithering substantially increase as the number of reflected signals increase. As with non-dithered signals, a WTRU may use a reflected signal instead of the direct path signal. It is possible that the dithering may increase the overall size of a geographic area within which null areas are located, as can be seen from comparing null area 87 (FIG. 5) and the area 88 (FIG. 6) within which null area 87 moves while being dithered. Since the signals are being dithered, however, although area 88 is larger, the effect of null 87 is actually diminished because it is no longer static and instead is being moved around within area 88. That is, within area 88 (and area 25 shown in FIG. 2) the error rate in any one position in area 88 (and area 25) will drop as a result of dithering so that the devices can now properly receive messages. This is accomplished by the fact that, although dithering does not completely eliminate error producing conditions (i.e. nulls), it does spread them over a much larger physical area.

The effect of dithering in a multipath environment is that any given WTRU may choose a specific signal path (direct or reflected) and utilize it, align and additively combine the individual paths (direct and/or reflected) to improve the received signal, and/or maximum-ratio combine as many paths (direct and/or reflected) as possible to optimally improve the receive signal.

In the case of a WTRU alternating between signal paths, it is presumed that the different signal paths carry data which is sufficiently synchronous for the WTRU to continue to process the data without interruption when changing to different instances of the same signal defined by the different paths.

Figure 7:
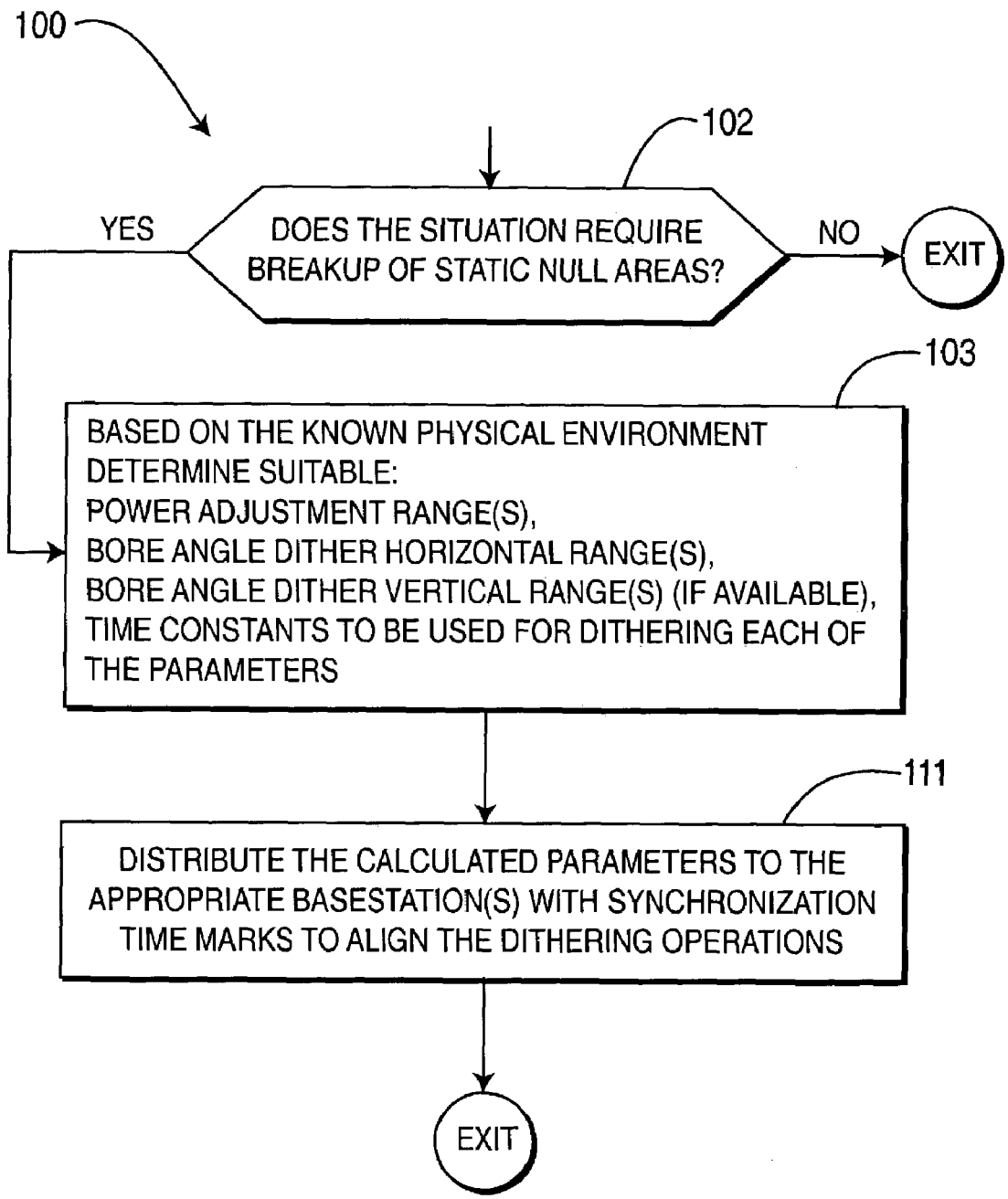
FIG. 7 is a flowchart showing an exemplary procedure for executing the dithering of signals in accordance with the present invention.

Referring now to FIG. 7, a method 100 for executing the dithering of signals is shown. To begin, a decision is made in step 102 as to whether the signal situation requires breakup of null areas. The decision may be made as explained above in connection with FIG. 3. If there is a requirement for a breakup of null areas, determinations are made in step 103 as to suitable power adjustment ranges, boresight angle dither vertical ranges (if available), and time constants to be used for each dithered parameter.

Based on the determinations made in step 103, the calculated parameters are distributed (step 111) to the appropriate base stations, with synchronization time marks to align the dithering operations.

While the present invention has been described in terms of the preferred embodiment, other variations, which are within the scope of the invention as outlined in the claims below will be apparent to those skilled in the art.

What is claimed is:

1. In a wireless telecommunications network in which a plurality of base stations may simultaneously transmit signals to wireless transmit and receive units (WTRUs), a method comprising:
   determining whether a static null area exists in a region covered by the base stations, the static null area being caused by interference between two or more overlapping signals; and
   if it is determined that a static null area exists in the region, effecting a dithering change in a transmission parameter of one of said transmit signals in the region in accordance with a control signal with synchronization time marks for aligning the dithering change, thereby shifting the static null area.

2. The method of claim 1, wherein the dithering change includes altering boresight of transmission of at least one of the overlapping signals, thereby shifting the null areas so that a wireless transmit and receive unit (WTRU) within the overlapping region will not statically remain within a null area.

3. The method of claim 1, wherein the dithering change includes altering transmission amplitude of at least one of the overlapping signals, thereby shifting the null areas so that a wireless transmit and receive unit (WTRU) within the overlapping region will not statically remain within a null area.

4. The method of claim 1, further comprising controlling signal processing of a base station to generate a beam formed transmission pattern, the beam formed transmission pattern dithered by altering a boresight of transmission of a signal transmitted by the base station.

5. The method of claim 4, wherein the beam formed transmission pattern is dithered by altering an amplitude of transmission of the base station, thereby shifting null areas so that a wireless transmit and receive unit (WTRU) within the overlapping region will not statically remain within a null area.

6. A base station for use in a wireless telecommunications network wherein a plurality of base stations may simultaneously transmit signals which overlap, the base station comprising:
   means for determining whether a static null area exists in a region covered by a base station, the static null area being caused by interference between two or more overlapping signals; and
   a circuit for effecting a dithering change in a transmission parameter of a signal transmitted from the base station in accordance with a control signal with synchronization time marks for aligning the dithering change, thereby shifting the static null area in the region covered by the base station.

7. The base station of claim 6, further comprising a circuit for determining a requirement for reducing interference nulls within a region where a signal transmitted from the base station overlaps with a signal transmitted from other simulcasting base stations.

8. The base station of claim 6 wherein the dithering change alters the location of null areas resulting from the overlapping signals.

9. The base station of claim 6 wherein the circuit for effecting a dithering change shifts a transmission beam of the base station, thereby shifting the null areas so that a wireless transmit and receive unit (WTRU) will not statically remain within a null area.

10. The base station of claim 6, wherein the dithering change includes altering a boresight of transmission of the base station, thereby shifting the interference null areas so that a wireless transmit and receive unit (WTRU) within the overlap region will not statically remain within an interference null area.

11. The base station of claim 6, wherein the dithering change includes altering transmission amplitude of the base station, thereby shifting the interference null areas so that a wireless transmit and receive unit (WTRU) within the overlap region will not statically remain within an interference null area.

12. The base station of claim 6, wherein the dithering change includes altering a boresight and amplitude of transmission of the base station, thereby shifting the interference null areas so that a wireless transmit and receive unit (WTRU) within the overlap region will not statically remain within an interference null area.

13. The base station of claim 6, further comprising:
the base station provided as part of an array of base stations; and
a circuit for controlling signal processing of the array of base stations in order to generate a beam formed transmission pattern from each base station, the beam formed transmission pattern dithered by altering a transmission parameter of the base station.

14. In a radio communications network, a method of operating a base station in coordination with other simulcasting base stations within reception proximity, the method comprising:
determining whether a static null area exists in a region covered by a base station, the static null area being caused by interference between two or more overlapping signals transmitted from the base station and other simulcasting base stations; and
if it is determined that a static null area exists in the region, effecting a dithering change in a transmission parameter of a signal transmitted by the base station in accordance with a control signal with synchronization time marks for aligning the dithering change, thereby altering null areas resulting from the overlapping signals.

15. The method of claim 14, wherein the dithering change includes altering boresight of transmission of the signal transmitted by the base station, thereby shifting the null areas so that a wireless transmit and receive unit (WTRU) within the overlap region will not statically remain within a null area.

16. The method of claim 14, wherein the dithering change includes altering transmission amplitude of a signal transmitted from the base station, thereby shifting the null areas so that a wireless transmit and receive unit (WTRU) in the overlapping region will not statically remain within a null area.

17. The method of claim 14, wherein the dithering change includes altering an amplitude and boresight of transmission of a signal transmitted from the base station, thereby shifting the null areas so that a wireless transmit and receive unit (WTRU) in the overlapping region will not statically remain within a null area.

18. The method of claim 14, further comprising controlling signal processing of a base station to generate a beam formed transmission pattern, the beam formed transmission pattern dithered by altering a transmission parameter of a signal transmitted by the base station.

19. In a wireless telecommunications network having a plurality of base stations that may simultaneously transmit to wireless transmit and receive units (WTRUs), a method comprising:
determining whether a static null area exists in a region covered by a base station, the static null area being caused by interference between two or more overlapping signals transmitted from the base station and from at least one other base station; and
effecting a dithering change in a transmission parameter of a signal in the overlapping region in accordance with a control signal with synchronization time marks for aligning the dithering change, thereby altering a pattern of interference null areas resulting from the overlapping signals.

20. The method of claim 19, wherein the dithering change includes altering a boresight of transmission of the signal transmitted from the base station, thereby shifting the null areas so that a wireless transmit and receive unit (WTRU) in the overlapping region will not statically remain within a null area.

21. The method of claim 19, wherein the dithering change includes altering transmission amplitude of the signal transmitted from the base station, thereby shifting the null areas so that a wireless transmit and receive unit (WTRU)) in the overlapping region will not statically remain within a null area.

22. The method of claim 19, wherein the dithering change includes altering transmission amplitude and boresight of transmission of the signal transmitted from the base station, thereby shifting the null areas so that a wireless transmit and receive unit (WTRU) in the overlapping region will not statically remain within a null area.

23. The method of claim 19, further comprising controlling signal processing of a base station to generate a beam formed transmission pattern, the beam formed transmission pattern dithered by altering a transmission parameter of a signal transmitted by the base station.

24. A method for reducing interference effects generated by overlapping signals transmitted by at least one base station in a wireless telecommunications network, the method comprising:
determining a requirement to reduce static null areas in regions covered by a the at least one base station having overlapping signals, the static null area being caused by interference between two or more overlapping signals;
in the event of the requirement to reduce null areas, determining a dithering parameter to shift the null areas so that a WTRU within a region of overlapping signals does not statically remain within the null area; and
controlling the at least one base station in the network by distributing a control signal with synchronization time marks in order to align a dithering change resulting from implementation of the dithering parameter.

25. The method of claim 24 wherein the overlapping signals are transmitted from a single base station and occur as a result of a single signal transmitted from the base station being subject to multipath.

26. The method of claim 24 wherein the overlapping signals are separately broadcast from at least two base stations.

27. A base station for use in a wireless telecommunications network and having an antenna whose signal is subject to multipath, the base station comprising:
means for determining whether a static null area exists in a region covered by the base station, the static null area being caused by interference between two or more overlapping signals; and
a circuit for effecting a dithering change in a transmission parameter of the signal in a region having overlapping signals in accordance with a control signal with synchronization time marks for aligning the dithering change, thereby shifting the null area in the region covered by the base station.

28. The base station of claim 27, further comprising a circuit for determining a requirement for reducing interference nulls within the overlapping region.

29. The base station of claim 27 wherein the dithering change alters the location of null areas resulting from the overlapping signals.

30. The base station of claim 27 wherein the circuit for effecting a dithering change shifts a transmission beam of the base station, thereby shifting the null areas so that a wireless transmit and receive unit (WTRU) will not statically remain within a null area.

31. The base station of claim 27, wherein the dithering change includes altering a boresight of transmission of the base station, thereby shifting the interference null areas so that a wireless transmit and receive unit (WTRU) within the overlap region will not statically remain within an interference null area.

32. The base station of claim 27, wherein the dithering change includes altering transmission amplitude of the base station, thereby shifting the interference null areas so that a wireless transmit and receive unit (WTRU) within the overlapping region will not statically remain within an interference null area.

33. The base station of claim 27, wherein the dithering change includes altering a boresight and amplitude of transmission of the base station, thereby shifting the interference null areas so that a wireless transmit and receive unit (WTRU) within the overlapping region will not statically remain within an interference null area.

34. The base station of claim 27, further comprising:
the base station provided as part of an array of base stations; and
a circuit for controlling signal processing of the array of base stations in order to generate a beam formed transmission pattern from each base station, the beam formed transmission pattern dithered by altering a transmission parameter of the base station.

35. In a wireless telecommunications network having a plurality of base stations that may simultaneously transmit to wireless transmit and receive units (WTRUs), a method comprising:
determining whether a static null area exists in a region covered by a base station, the static null area being caused by interference between two or more overlapping signals which are multipath components transmitted from the same base station; and
effecting a dithering change in a transmission parameter of the signal transmitted from the base station in accordance with a control signal with synchronization time marks for aligning the dithering change, thereby shifting the null area in the region covered by the base station.

36. The method of claim 35, wherein the dithering change includes altering a boresight of transmission of a signal transmitted from the base station, thereby shifting the null areas so that a wireless transmit and receive unit (WTRU) in the overlapping region will not statically remain within a null area.

37. The method of claim 35, wherein the dithering change includes altering transmission amplitude of a signal transmitted from the base station, thereby shifting the null areas so that a wireless transmit and receive unit (WTRU) in the overlapping region will not statically remain within a null area.

38. The method of claim 35, wherein the dithering change includes altering transmission amplitude and boresight of transmission of a signal transmitted from the base station, thereby shifting the null areas so that a wireless transmit and receive unit (WTRU) in the overlapping region will not statically remain within a null area.

39. The method of claim 35, further comprising controlling signal processing of a base station to generate a beam formed transmission pattern, the beam formed transmission pattern dithered by altering a transmission parameter of a signal transmitted by the base station.

40. A method for reducing interference effects generated by overlapping signals transmitted in a wireless telecommunications network, the method comprising:
determining a requirement to reduce static null areas in regions having overlapping signals;
in the event of the requirement to reduce null areas, determining a dithering parameter to shift the null areas so that a WTRU within a region of overlapping signals does not statically remain within a null area;
controlling a base station in the network according to the dithering parameter so as to effect a dithering change; and
distributing a control signal to at least one base station with synchronization time marks in order to align the dithering change.

* * * * *